United States Patent
Hao et al.

(10) Patent No.: US 10,284,036 B2
(45) Date of Patent: May 7, 2019

(54) ELECTRIC MACHINE FOR HYBRID POWERTRAIN WITH ENGINE BELT DRIVE

(71) Applicant: GM GLOBAL TECHNOLOGY OPERATIONS LLC, Detroit, MI (US)

(72) Inventors: Lei Hao, Troy, MI (US); Chandra S. Namuduri, Troy, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 344 days.

(21) Appl. No.: 15/194,597

(22) Filed: Jun. 28, 2016

(65) Prior Publication Data

US 2017/0063187 A1    Mar. 2, 2017

Related U.S. Application Data

(60) Provisional application No. 62/209,083, filed on Aug. 24, 2015.

(51) Int. Cl.
H02K 1/27        (2006.01)
H02K 21/14       (2006.01)
(Continued)

(52) U.S. Cl.
CPC .......... H02K 1/2766 (2013.01); H02K 3/28 (2013.01); H02K 21/14 (2013.01); *H02P 9/48* (2013.01)

(58) Field of Classification Search
CPC ........ H02K 1/2766; H02K 21/14; H02K 3/28; H02P 9/48; H02P 6/08
(Continued)

(56) References Cited

U.S. PATENT DOCUMENTS 2,990,508 A    6/1961  Thompson
5,166,568 A *  11/1992 Nystuen ................ D06F 37/304
                                                    310/184
(Continued)

FOREIGN PATENT DOCUMENTS

CN    1202028 A    12/1998
CN    1856921 A    11/2006
(Continued)

OTHER PUBLICATIONS

Milind Paradkar, Design of a High Performance Ferrite Magnet-Assisted Synchronous Reluctance Motor for an Electric Vehicle, Institute of Electrical and Electronics Engineers, 2012, pp. 4079-4083.

*Primary Examiner* — Alex W Mok
(74) *Attorney, Agent, or Firm* — Quinn IP Law

(57) ABSTRACT

An electric machine is provided that has a rotor assembly having a rotor core configured to support permanent magnets spaced around the rotor core to define a number of rotor poles. The rotor core has multiple rotor slots arranged as multiple barrier layers at each of the rotor poles. The multiple barrier layers are positioned adjacent one another between an inner periphery of the rotor core and an outer periphery of the rotor core and include a first barrier layer nearest the inner periphery. Permanent magnets are disposed in at least the first barrier layer. A stator assembly surrounds the rotor assembly. The electric machine is configured to function as a motor in a motoring mode and as a generator in a generating mode. The electric machine is configured with predetermined operating parameters selected for optimizing operation in the motoring mode and/or the generating mode.

20 Claims, 15 Drawing Sheets

(51) Int. Cl.
*H02K 3/28* (2006.01)
*H02P 6/08* (2016.01)
*H02P 9/48* (2006.01)

(58) Field of Classification Search
USPC .................................................. 310/68 D
See application file for complete search history.

(56) References Cited

U.S. PATENT DOCUMENTS

| | | | |
|---|---|---|---|
| 5,429,687 A * | 7/1995 | Goffart | B23P 15/00 |
| | | | 148/120 |
| 7,556,082 B2 | 7/2009 | Welchko et al. | |
| 8,928,197 B2 | 1/2015 | Jurkovic et al. | |
| 8,933,606 B2 | 1/2015 | Rahman et al. | |
| 2002/0190587 A1* | 12/2002 | Reutlinger | H02K 3/24 |
| | | | 310/68 R |
| 2005/0140236 A1 | 6/2005 | Jeong et al. | |
| 2006/0017345 A1 | 1/2006 | Uchida et al. | |
| 2006/0208606 A1 | 9/2006 | Hirzel | |
| 2007/0216249 A1 | 9/2007 | Gruendel et al. | |
| 2009/0045688 A1* | 2/2009 | Liang | H02K 1/2766 |
| | | | 310/156.07 |
| 2010/0079026 A1 | 4/2010 | Han et al. | |
| 2010/0090557 A1* | 4/2010 | El-Refaie | H02K 1/146 |
| | | | 310/198 |
| 2010/0109468 A1* | 5/2010 | Natsumeda | H02K 1/02 |
| | | | 310/156.43 |
| 2010/0244610 A1 | 9/2010 | Hao et al. | |
| 2011/0109180 A1 | 5/2011 | Akutsu et al. | |
| 2011/0169363 A1 | 7/2011 | Summers et al. | |
| 2011/0198962 A1* | 8/2011 | Tang | H02K 3/28 |
| | | | 310/198 |
| 2012/0020117 A1* | 1/2012 | Arnold | H01F 29/10 |
| | | | 363/15 |
| 2012/0187877 A1 | 7/2012 | Yamagiwa et al. | |
| 2012/0262022 A1* | 10/2012 | Takemoto | H02K 1/2793 |
| | | | 310/156.35 |
| 2013/0069470 A1 | 3/2013 | Jurkovic et al. | |
| 2013/0147303 A1 | 6/2013 | Kaiser et al. | |
| 2013/0241369 A1* | 9/2013 | Imazawa | H02K 3/12 |
| | | | 310/68 D |
| 2013/0270952 A1 | 10/2013 | Jurkovic et al. | |
| 2013/0342062 A1* | 12/2013 | Sekii | H02K 5/16 |
| | | | 310/90 |
| 2014/0010671 A1* | 1/2014 | Cryer | B60W 10/30 |
| | | | 417/53 |
| 2014/0046520 A1 | 2/2014 | Katoch et al. | |
| 2014/0125205 A1* | 5/2014 | Landfors | B60K 7/0007 |
| | | | 310/67 R |
| 2014/0252903 A1 | 9/2014 | Rahman et al. | |
| 2015/0091406 A1* | 4/2015 | Tajima | H02K 21/16 |
| | | | 310/156.38 |
| 2015/0171676 A1* | 6/2015 | Kobayashi | H02K 1/02 |
| | | | 310/156.43 |
| 2015/0295459 A1 | 10/2015 | Hao et al. | |
| 2017/0057373 A1 | 3/2017 | Hao et al. | |

FOREIGN PATENT DOCUMENTS

| | | |
|---|---|---|
| CN | 102263445 A | 11/2011 |
| CN | 202444342 U | 9/2012 |
| CN | 202545085 U | 11/2012 |
| JP | 2000316241 A | 11/2000 |

* cited by examiner

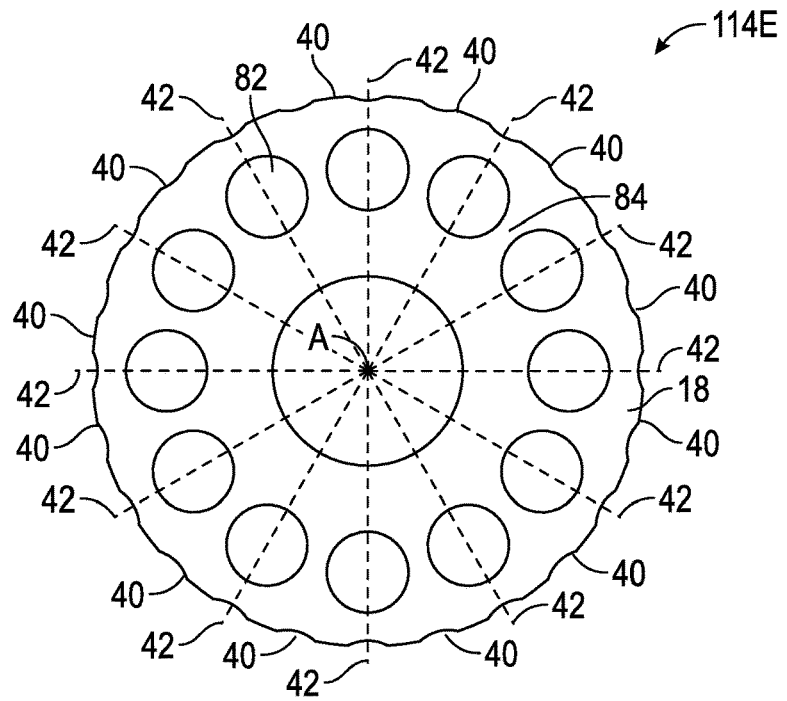
FIG. 10
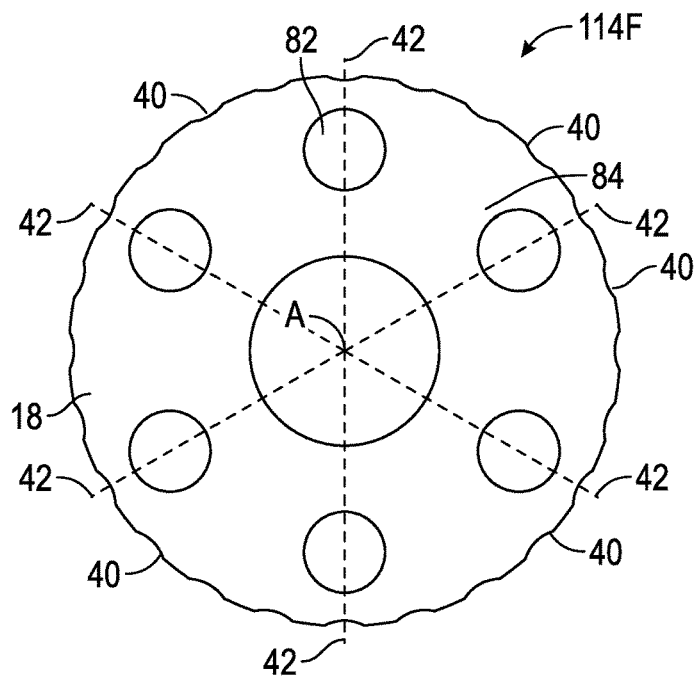 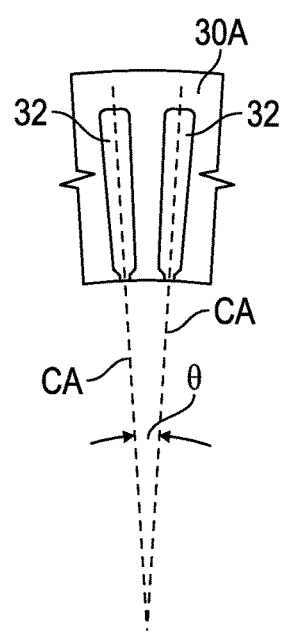
FIG. 11  FIG. 12

ELECTRIC MACHINE FOR HYBRID POWERTRAIN WITH ENGINE BELT DRIVE

CROSS-REFERENCE TO RELATED APPLICATION

This application claims the benefit of U.S. Provisional Application No. 62/209,083, filed Aug. 24, 2015, which is hereby incorporated by reference in its entirety.

TECHNICAL FIELD

The present teachings generally include an electric machine for a powertrain, and more particularly, an interior permanent magnet electric machine.

BACKGROUND

An electric motor utilizes electric potential energy to produce mechanical torque through the interaction of magnetic fields and electric current-carrying conductors. Some electric motors can also function as generators by using torque to produce electrical energy. An interior permanent magnet electric machine has a rotor assembly that includes a rotor core with magnets of alternating polarity spaced around the rotor core.

SUMMARY

An electric machine is provided that has a rotor assembly having a rotor core configured to support permanent magnets spaced around the rotor core to define a number of rotor poles. The rotor core has multiple rotor slots arranged as multiple barrier layers at each of the rotor poles. The multiple barrier layers are positioned adjacent one another between an inner periphery of the rotor core and an outer periphery of the rotor core and include a first barrier layer nearest the inner periphery. Permanent magnets are disposed in at least the first barrier layer. A stator assembly surrounds the rotor assembly. The electric machine is configured to function as a motor in a motoring mode and as a generator in a generating mode. The rotor assembly, the stator assembly, and the permanent magnets are configured with parameters selected to provide at least one of a predetermined efficiency at rated power, a predetermined power density, a predetermined torque density, a predetermined peak power range, or a predetermined maximum speed of the electric machine in the motoring mode or in the generating mode.

The electric machine may be particularly well suited for use in as a belt-driven machine, such as in a hybrid powertrain. For example, the electric machine may be used with an engine having a crankshaft with a belt drive train operatively connecting the electric machine with the crankshaft. A battery may be operatively connected to the stator assembly. A motor controller power inverter module (MPIM) may be operatively connected to the stator assembly. The MPIM may be configured to control the electric machine to achieve the motoring mode in which the electric machine adds torque to the crankshaft using stored electrical power from the battery. The MPIM is configured to control the electric machine to achieve the generating mode in which the electric machine converts torque of the crankshaft into stored electrical power in the battery.

The electric machine may be for a powertrain in an automotive vehicle, or a non-automotive vehicle, such as a farm vehicle, a marine vehicle, an aviation vehicle, etc. It is to also be appreciated that the electric machine can be included in appliances, construction equipment, lawn equipment, etc., instead of vehicles.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 10 is a schematic illustration in fragmentary side view of a portion of a rotor core for a rotor assembly having twelve rotor poles in accordance with the present teachings.

FIG. 11 is a schematic illustration in fragmentary side view of a portion of a rotor core for a rotor assembly having six rotor poles in accordance with the present teachings.

FIG. 12 is a schematic illustration of fragmentary side view of a portion of a stator assembly showing two adjacent stator slots in accordance with the present teachings.

DETAILED DESCRIPTION

Figure 1:
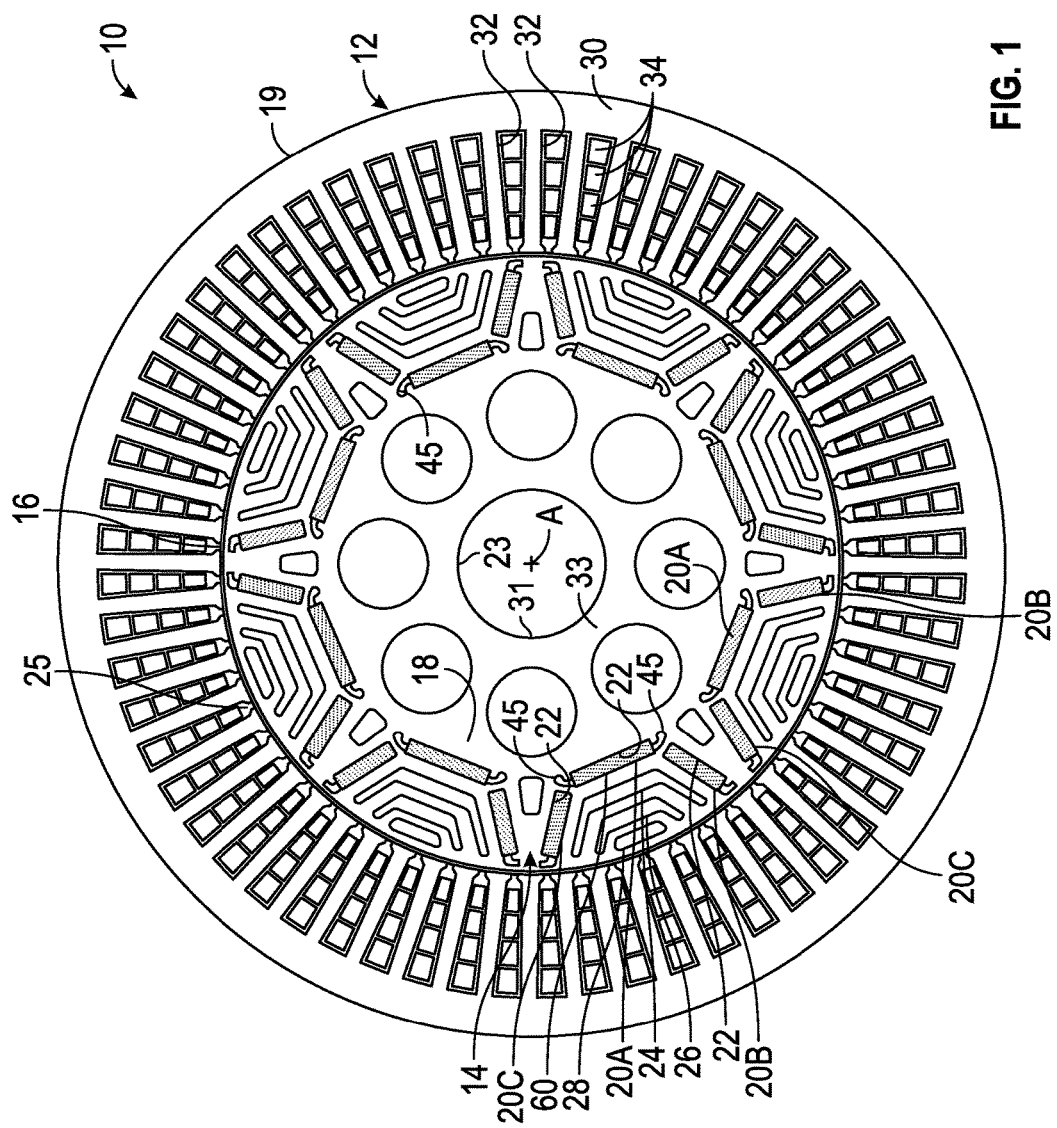
FIG. 1 is a schematic illustration in side view of a first embodiment of an electric machine having a rotor assembly and a stator assembly.

Referring to the drawings, wherein like reference numbers refer to like components throughout the views, FIG. 1 shows an electric machine 10 having a stator assembly 12 and a rotor assembly 14. As discussed herein, the electric machine 10 has a multi-phase stator assembly 12 and an interior permanent magnet assisted synchronous reluctance rotor assembly 14 configured with an optimal design and geometry to satisfy predetermined operating parameters. The electric machine 10 is particularly optimized for use as an engine belt-driven electric machine that provides a regenerative mode and a torque assist mode. In particular, the electric machine 10 is designed to achieve a relatively high efficiency, such as 85 percent efficiency over a predetermined output power and speed range, a relatively high power density (e.g., greater than 1500 watts) and/or a high torque density (e.g., greater than 5 Newton-meters per liter), a relatively wide peak power range (e.g., 4 to 6 kilowatts), a maximum speed of at least 18,000 revolutions per minute (rpm), a relatively low cost (by minimizing the required number of permanent magnets), a relatively low mass and inertia (for fast dynamic response to driver change of mind), and to fit into a relatively small packaging space. Various alternative embodiments, including alternative electric machines 10A, 10B (FIGS. 4 and 5) that can be used in place of electric machine 10, as well as alternative rotor assemblies 114A, 114B, 114C, 114D, 114E, and 114F (FIGS. 6-11), and an alternative stator assembly (FIG. 12) also have optimal designs and geometries to meet the same predetermined operating parameters. Any of these embodiments may be used in a powertrain 300, shown in FIG. 20 in an engine belt-driven arrangement to provide engine cranking, regeneration and torque assist modes.

Figure 2:
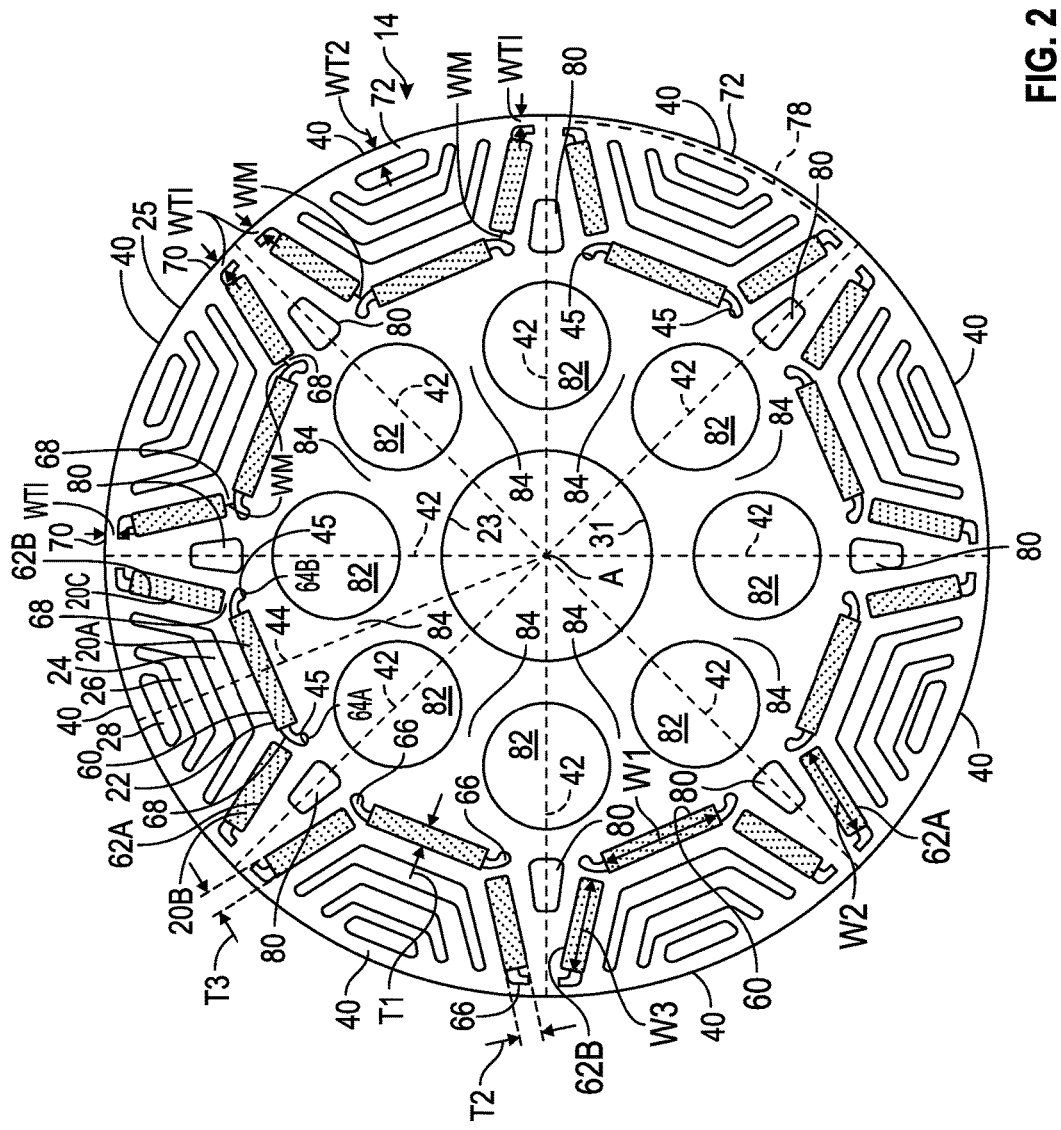
FIG. 2 is a schematic illustration in side view of a rotor assembly of the electric machine of FIG. 1.
Figure 3:
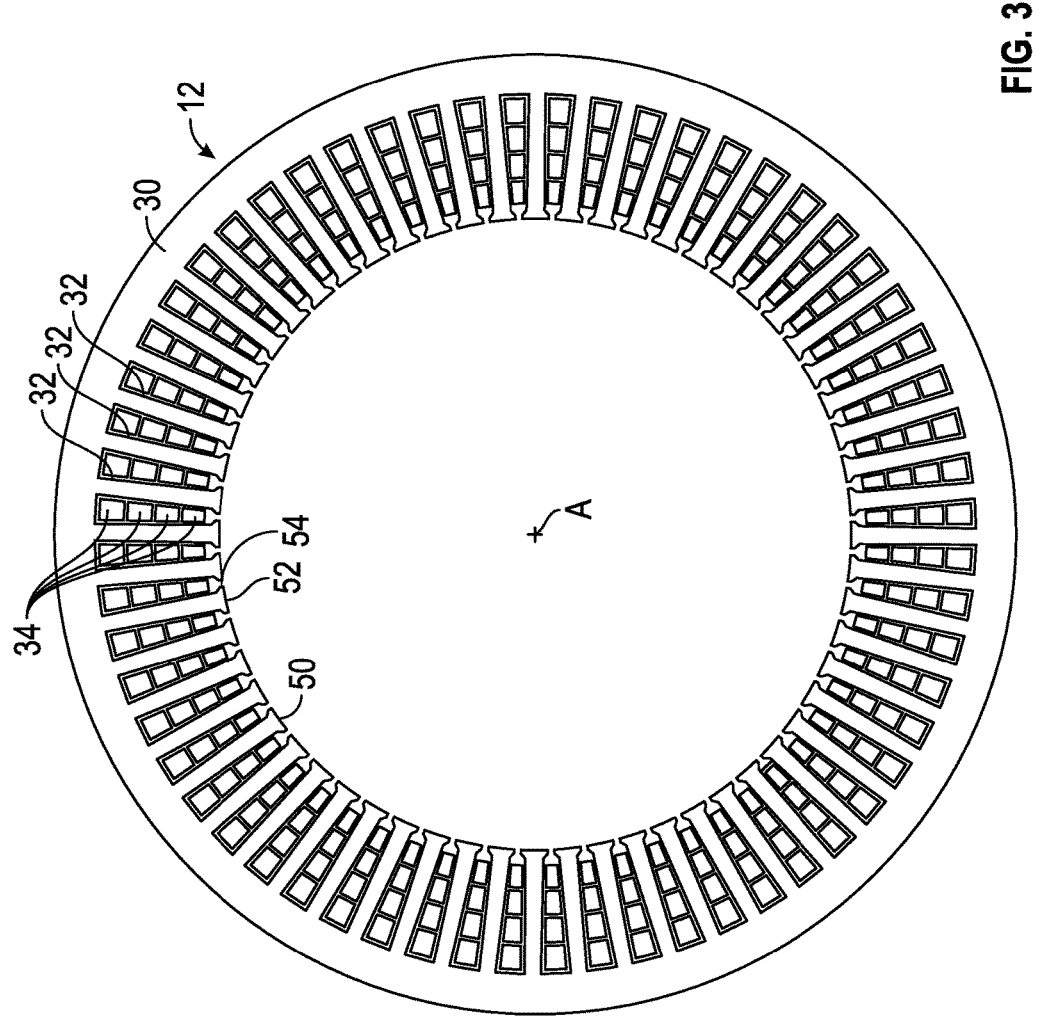
FIG. 3 is a schematic illustration in side view of a stator assembly of the electric machine of FIG. 1
Figure 20:
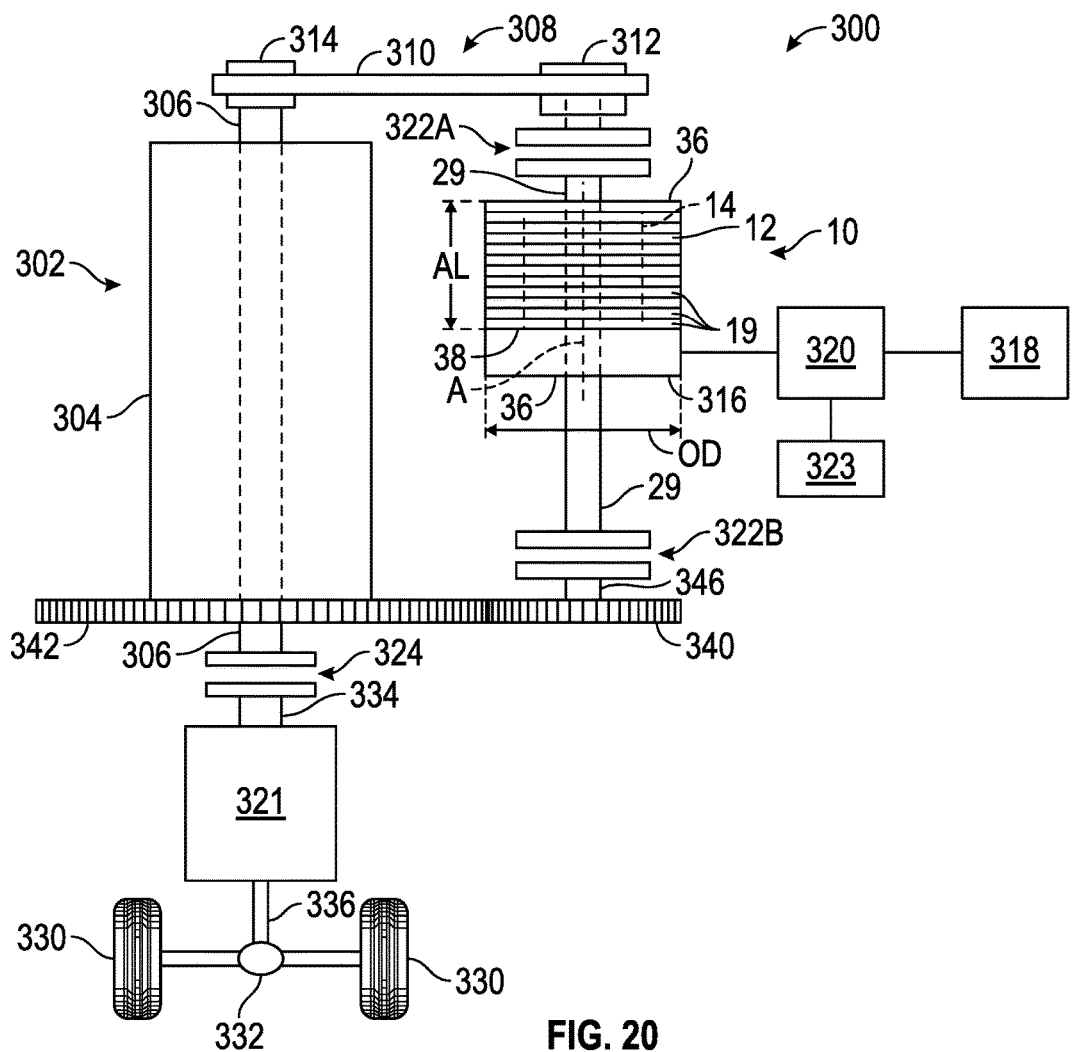
FIG. 20 is a schematic illustration of a powertrain including the electric machine of FIG. 1.

Referring to FIGS. 1-3, the stator assembly 12 radially surrounds the rotor assembly 14 with an air gap 16 defined therebetween. The electric machine 10 is configured so that the air gap 16 may be, by way of non-limiting example only, not less than 0.2 millimeters (mm) and not greater than 0.5 mm in order to maximize power and minimize the number of magnets 20A, 20B, 20C. Both the stator assembly 12 and the rotor assembly 14 are generally annular in shape and are concentric about a longitudinal center axis A of the electric machine 10 (shown best in FIG. 20). The stator assembly 12 has a stator core 30 and the rotor assembly 14 has a rotor core 18. Both the stator core 30 and the rotor core 18 can be assembled from multiple laminations stacked axially along the axis A. For example, FIG. 20 shows stacks of stator laminations 19. It should be appreciated that a motor housing can radially surround an outer periphery of the stator laminations 19 and can support a motor shaft 29 of the electric machine 10. The housing is not shown in FIG. 20 so that the laminations 19 will be visible.

The rotor assembly 14 includes a rotor core 18 configured to support multiple permanent magnets 20A, 20B, 20C spaced around the rotor core 18. Specifically, the rotor core 18 has multiple rotor slots 22, 24, 26, 28, also referred to herein as barriers or barrier layers, arranged as multiple barrier layers including a first barrier layer 22, a second barrier layer 24, a third barrier layer 26, and a fourth barrier layer 28. The first barrier layer 22 is closest to an inner periphery 23 of the rotor core 18. The second barrier layer 24 is positioned between the first barrier layer 22 and the third barrier layer 26. The third barrier layer 26 is positioned between the second barrier layer 24 and the fourth barrier layer 28. The fourth barrier layer 28 is further from the inner periphery 23 than the barrier layers 22, 24, and 26. The fourth barrier layer 28 is closer to an outer periphery 25 of the rotor core 18 than is the first barrier layer 22, and at least portions of the second and third barrier layers 24, 26. The barrier layers 24, 26 and 28 are radially outward of the first barrier layer 22 and between the wing segments 20B, 20C of the first barrier layer 22. In the embodiments shown, only the first barrier layer 22 houses magnets 20A, 20B, 20C. The other barrier layers 24, 26, 28 act as air barriers. In other embodiments, one or more of the barrier layers 24, 26, 28 can also be filled with permanent magnets. For example, all barrier layers may be filled with magnets except the outermost barrier layer. Still further, as shown herein, the total number of barrier layers at each rotor pole 40 may be not less than two, and not greater than five. In any embodiment, at least a radially outermost one of the barrier layers is empty (i.e., contains only air as it houses no magnets or other components).

The rotor assembly 14 is configured to be rotatable about the axis A that extends longitudinally through the center of the electric machine 10. The rotor core 18 is rigidly connected to and rotates with a motor shaft 29 (shown only in FIG. 20) that extends through a shaft opening 31 in the rotor core 18. The material of the rotor core 18 around the shaft opening 31 functions as a center shaft support 33.

The stator assembly 12 includes a stator core 30 that has multiple circumferentially-spaced stator slots 32. The stator slots 32 extend lengthwise along the axis A. The stator slots 32 are configured to house multi-phase stator windings 34. The stator windings 34 can be grouped into different sets, each of which carry an identical number of phases of electrical current, such as three phases, five phases, six phases, or seven phases, as is further shown and described in FIGS. 13-19 and is understood by those skilled in the art. The stator windings 34 may extend axially beyond first and second axial ends 36, 38 of the stator core 30, shown in FIG. 20. The axial length AL of the stacks of laminations 19 (i.e., the distances along the axis A between the axial ends 36, 38) not including any extending portion of the windings 34 is also referred to herein as the active length of the electric machine 10. A ratio of an outer diameter OD of the laminations 19 of the stator assembly 12 to the axial length AL may be, by way of non-limiting example only, not less than 1.5 and not greater than 3.5, and, by way of non-limiting example only, with the axial length AL not exceeding 60 mm and the outer diameter OD not exceeding 136 mm in order to satisfy predetermined packing space requirements for a particular application of the electric machine 10, such as in a vehicle powertrain.

Referring to FIG. 2, the rotor has eight poles 40 established at least partially by the placement of the permanent magnets 20A, 20B, 20C in the first barrier layer 22 generally circumferentially disposed in the rotor core 18 and by the selected polarity of the magnets 20A, 20B, 20C. Although eight poles 40 are shown, the electric machine 10 can be configured to have a different number of poles 40. By way of non-limiting example, the number of poles 40 can be between 6 and 12 in order to meet predetermined torque, power, and packaging parameters while remaining within predetermined noise limits. Each pole 40 includes a set of the multiple barrier layers 22, 24, 26, 28. The poles 40 are shown separated from one another by pole boundaries 42 extending radially through the rotor core 30. Each pole 40 includes all of the material of the rotor core 30 bounded by the respective pole boundaries 42 of the pole 40. A pole axis 44 of only one of the poles 40 is shown, although each pole 40 has a similar pole axis 44 extending radially through the center of the pole 40. FIG. 10 shows an embodiment of a rotor assembly 114E configured with twelve poles 40. Twelve sets of barrier layers 22 and magnets 20A, 20B, and 20C like those of FIG. 1 would be positioned radially outward of the twelve spokes 84 in the rotor assembly 114E. FIG. 11 shows an embodiment of a rotor assembly 114E configured with six poles 40. Six sets of barrier layers 22 and magnets 20A, 20B, and 20C like those of FIG. 1 would be positioned radially outward of the six spokes 84 in the rotor assembly 114F. A total number of poles from six to twelve, and especially of six to eight total poles enables torque, power, noise, and packaging requirements to be met.

The rotor core 18 is a steel material selected to maintain high speed rotational stress within predetermined limits. By way of non-limiting example, a computer-based rotational stress analysis of the rotor assembly 14 indicates that the furthest distal portions 45 of a center segment 60 of the first barrier layer 22 experience the greatest rotational stress and that, when the electric machine 10 is operated in motoring mode at 20,000 rpm and at 150 degrees C., the stress at distal portion 45 will remain less than a predetermined maximum allowable rotational stress based on material properties.

Referring to FIGS. 1 and 3, in one example embodiment, the stator core 30 has sixty stator slots 32 circumferentially arranged about the stator core 30 and opening at an inner periphery 50 of the stator core 30 toward the air gap 16. Stator teeth 52 separate each of the stator slots 32 and are configured with ends 54 that retain the stator windings 34. A greatest common divisor (GCD) of the number of stator slots 32 and the number of poles 40 of the rotor core 18 is the largest positive integer that divides the number of stator slots 32 and the number of poles 40 without a remainder. In the embodiment shown, because the stator core 30 has sixty stator slots 32 and the rotor core 18 has eight poles 40, the GCD is 4. In other embodiments, the GCD can be a different number, and is preferably greater than or equal to 4. For example, in an embodiment in which the number of rotor poles is six (see FIG. 11), the number of stator slots may be 48, 72, 90, or 108. In an embodiment in which the number of rotor poles is eight (see FIG. 1), the number of stator slots may be 60, 72, 84, 96, or 108.

FIG. 12 shows two adjacent stator slots 32 in a portion of a stator core 30A. Radially extending center axes CA through the stator slots 32 are separated by an angle $\theta$. The number of stator slots 32 corresponds to the angle $\theta$ in a stator core 30A assuming stator slots 32 are evenly spaced about the rotor core 30A. For example, if the angle $\theta$ is 7.5 degrees, the number of stator slots is 48. If the angle $\theta$ is 6 degrees, the number of stator slots is 60. If the angle $\theta$ is 5 degrees, the number of stator slots is 72. If the angle $\theta$ is 4.28 degrees, the number of stator slots is 84. If the angle $\theta$ is 3.75 degrees, the number of stator slots is 96. If the angle $\theta$ is 3.33 degrees, the number of stator slots is 108.

A lowest common multiplier (LCM) of the number of stator slots 32 and the number of poles 40 is the smallest positive integer that is divisible by both the number of stator slots 32 and the number of poles 40. In the embodiment shown in FIGS. 1-3, because the stator core 30 has sixty stator slots 32 and the rotor core 18 has eight poles 40, the LCM is 120. In other embodiments, the LCM can be a different number, and is preferably greater than or equal to 48 to minimize cogging torque due to the interaction of the permanent magnets 20A, 20B, 20C and the teeth 52 of the stator core 30. If the LCM is less than 72, a skewed rotor assembly may be used in order to satisfy torque ripple requirements. A skewed rotor assembly has the magnets (and therefore the rotor poles) displaced angularly in a direction along the axis of rotation. In a non-skewed rotor assembly, the magnets (and therefore the rotor poles) remain in the same angular positions in a direction along the axis of rotation. Skewed rotor assemblies are generally more expensive. For that reason, the number of stator slots 32 and the number of poles 40 may be selected so that the LCM is greater than or equal to 84 and a non-skewed rotor assembly is used.

Referring to FIG. 2, the first barrier layer 22 has multiple discrete segments physically separated from one another by the material of the rotor core 18. Specifically, the segments include a center segment 60 that houses the magnet 20A. The first barrier layer 22 also has first and second wing segments 62A, 62B that are positioned generally near opposite ends 64A, 64B of the center segment 60 toward the outer periphery 25 and angle and away from one another. The center segment 60 is positioned so that the magnet 20A housed therein extends lengthwise generally perpendicular to a radius of the rotor core 18, with the radius being shown as and represented by the pole axis 44.

For costs savings, it is desirable that each of the permanent magnets 20A, 20B, and 20C have identical, rectangular shapes. This may be accomplished by configuring the center segment 60 and the first and second wing segments 62A, 62B to have identical thicknesses T1, T2, T3. In one non-limiting example, the thicknesses T1, T2, and T3 enable magnets 20A, 20B, 20C with a thickness of 1.5 mm to 2.5 mm to be fit therein. In the embodiments discussed herein, the total mass of the magnet material used (i.e., the mass of magnets 20) is about 150 grams to 250 grams. By using less magnetic material but still meeting predetermined operating parameters, costs are reduced. The magnets of the electric machine 10 may all be if the same material, or different ones of the magnets may be different materials.

Although the permanent magnets 20A, 20B, 20C are rectangular in shape, the center segment 60 and wing segments 62A, 62B have a more complex shape, with a generally rectangular middle portion which fits to and holds the magnets 20A, 20B, 20C, and air pockets 66 extending at one or both ends. The lengths of the center segments 60 and the wing segments 62A, 62B of the stacked rotor laminations in the direction of the axis A may be equal. The length of center segments 60 in the direction of the axis A and wing segments 62A, 62B of the stacked rotor lamination may be equal. By doing that, the permanent magnets 20A, 20B, and 20C can have identical, rectangular shapes. Multiple magnets may be positioned in each of the aligned segments 20A, 20B, 20C in the direction of the length of the axis A. Additionally, the widths W1, W2, W3 of the respective center segment 60 and the first and second wing segments 62A, 62B are configured to enable magnets of greater than 5 mm in width to fit therein.

The center segment 60 and the wing segments 62A, 62B of the first barrier layer 22 are separated from one another by material of the rotor core 18. In other words, the center segment 60 and the wing segments 62A, 62B are discreet and discontinuous from one another because the rotor core 18 defines a mid-bridge 68 between the center segment 60 and the first wing segment 62A, and between the center segment 60 and the second wing segment 62B. By way of non-liming example, the rotor core 18 can be configured so that a minimum width WM of each mid-bridge 68 is not less than 0.7 mm and not greater than 2 mm. The minimum width WM is defined as the minimum distance between the center segment 60 and the first wing segment 62A or the second wing segment 62B. A mid-bridge 68 configured in this manner helps to meet the predetermined rotational stress requirement of the electric machine 10, and minimizes necessary magnet material to potentially reduce manufacturing costs.

The material of the rotor core 18 also forms a first top bridge 70 between each of the first and second wing segments 62A, 62B and the outer periphery 25 of the rotor core 18. By way of non-limiting example, a minimum width WT1 of each first top bridge 70 is not less than 0.75 mm and not greater than 2 mm.

Additionally, the material of the rotor core 18 forms a second top bridge 72 that extends between each of the second barrier layer 24, the third barrier layer 26, and the fourth barrier layer 28 and the outer periphery 25. In other words, the second top bridge 72 is that portion of each rotor pole 40 that is between first and second wing segments 62A, 62B of the rotor pole 40 and the outer periphery 25. For purpose of illustration, FIG. 2 illustrates the circumferential angular expanse 78 (i.e., a segment of the circumference of the rotor core 18) of one of the second top bridges 72. By way of non-limiting example, a minimum width WT2 of each second top bridge 72 is not less than 1 mm and not greater than 3 mm. The magnets 20A, 20B, 20C create the torque-producing flux in the electric machine 10 and also serve to saturate the top bridges 70 to minimize a flux shunting effect.

For mass savings, the rotor core 18 has cavities 80 between adjacent wing segments 62A, 62B of adjacent sets of first barrier layers 22 of adjacent poles 40. Additional cavities 82 are positioned radially inward of the first barrier layers 22 and radially outward of the inner periphery 23. The cavities 80, 82 are in relatively low magnetic flux density regions of the rotor core 18 to reduce weight and inertia of the rotor core 18. This enables fast dynamic responsiveness of the electric machine 10, such as when a vehicle operator changes operating demands, thereby potentially increasing vehicle fuel economy.

The cavities 82 are positioned so that spokes 84 are defined by the rotor core 18 between adjacent ones of the cavities 82 and centered within each rotor pole 40. That is, the spokes 84 are centered under the center segments 60 and the center magnets 20A. By positioning the spokes 84 so that they are directly under the center segments 60, the spokes 84 are radially aligned with the poles 40 so that the center pole axis 42 of each pole 40 runs through the radial center of the respective spoke 84 under the center segment 20A. Accordingly, magnetic flux through the rotor core material of the spokes 84 aids in magnetizing the magnets 20A, 20B, 20C. The spokes 84 in the embodiment shown are non-linear in shape, as they are defined in part by the circular cavities 82. The spokes 84 extend generally radially between the portion of the rotor core 18 functioning as the center shaft support 33 and the center segments 60.

By providing two to five barrier layers at each rotor pole 40, the reluctance torque of the electric machine 10 is greater than the electromagnetic torque, which helps to minimize cost. Additionally, the radially-innermost barrier layer 22 is fully or partially filled with magnets 20. A layer is "fully" filled with magnets 20 if each segment of the layer houses a magnet 20, and is only partially filled with magnets 20, if at least one of the segments of the layer is empty. By providing magnets 20 in only some of the barrier layers, costs are minimized.

Figure 4:
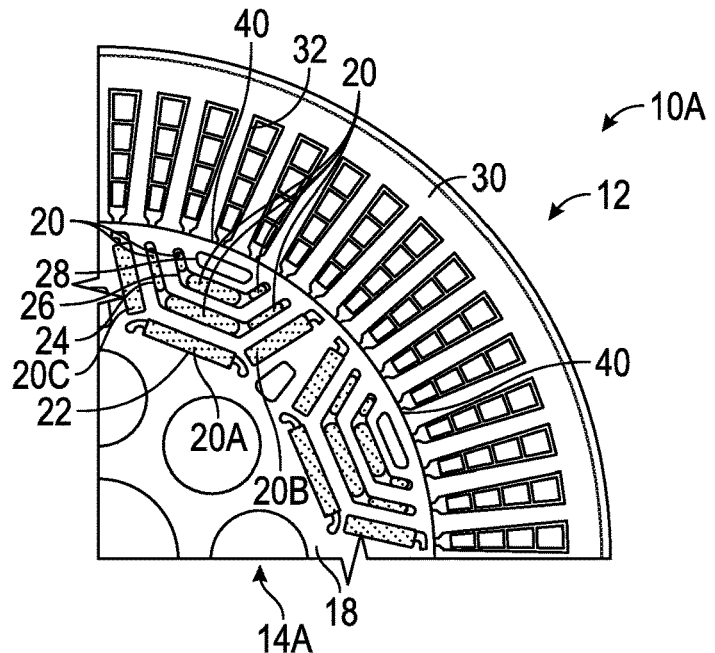
FIG. 4 is a schematic illustration in fragmentary side view of a second embodiment of an electric machine in accordance with the present teachings.

FIG. 4 shows an alternative electric machine 10A that can be used in place of the electric machine 10 in the powertrain 300 of FIG. 20. The electric machine 10A has a stator assembly 12 identical to that of electric machine 10, and a rotor assembly 14A identical to the rotor assembly 14 of electric machine 10 except that additional magnets 20 fill all except the outermost barrier layer 28. In other words, in the electric machine 10, only the radially-innermost (first) barrier layer 22 is filled with magnets 20A, 20B, 20C. The second through the fourth barrier layers 24, 26, and 28 are empty (hold no magnets). In contrast, in the rotor assembly 14A of the electric machine 10A, the first, second, and third barrier layers 22, 24, and 26 hold magnets and only the radially-outermost (fourth) barrier layer 28 is empty. The electric machine 10A has a rotor core 30 configured with eight poles 40 and a stator core 30 with 60 slots 32.

Figure 5:
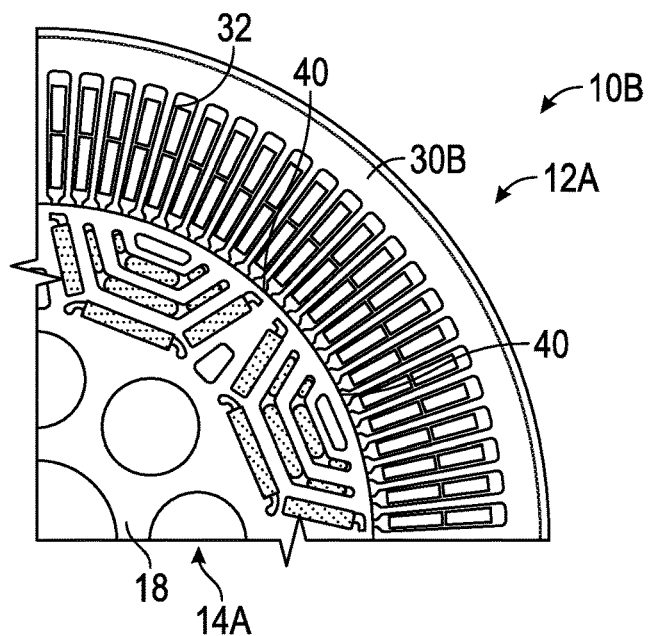
FIG. 5 is a schematic illustration in fragmentary side view of a third embodiment of an electric machine in accordance with the present teachings.

FIG. 5 shows an alternative electric machine 10B that can be used in place of the electric machine 10 in the powertrain 300 of FIG. 20. The electric machine 10B has a rotor assembly 14A identical to the rotor assembly 14A of FIG. 4, and a stator assembly 12A identical to that of electric machine 10 of FIG. 1, except that the stator assembly 12A has a stator core 30B configured with 96 slots 32.

Figure 6:
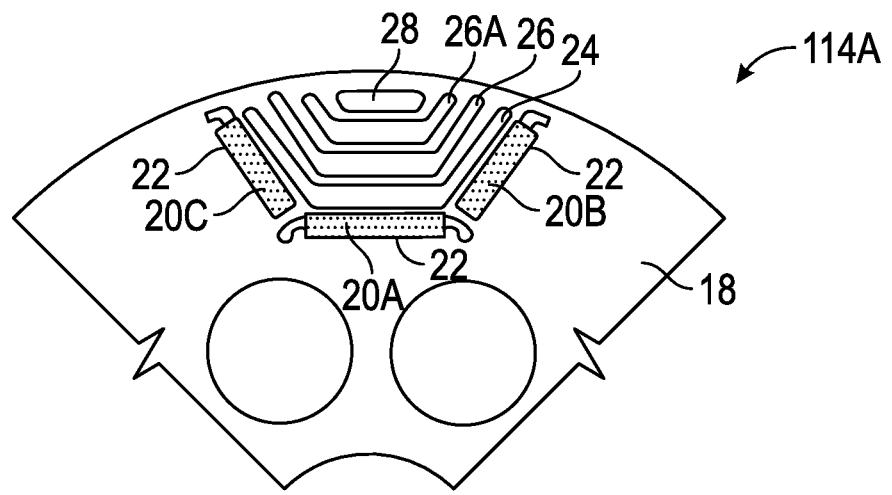
FIG. 6 is a schematic illustration in fragmentary side view of an alternative embodiment of a rotor assembly in accordance with the present teachings.

FIG. 6 shows a rotor assembly 114A identical to the rotor assembly 14 of electric machine 10 except that an additional barrier layer 26A is added so that there are five barrier layers 22, 24, 26, 26A, and 28 at each rotor pole 40. Like rotor assembly 14 of FIG. 1, only the barrier layer 22 holds magnets 20A, 20B, and 20C. The additional barrier layers 24, 26, 26A, and 28 are empty.

Figure 7:
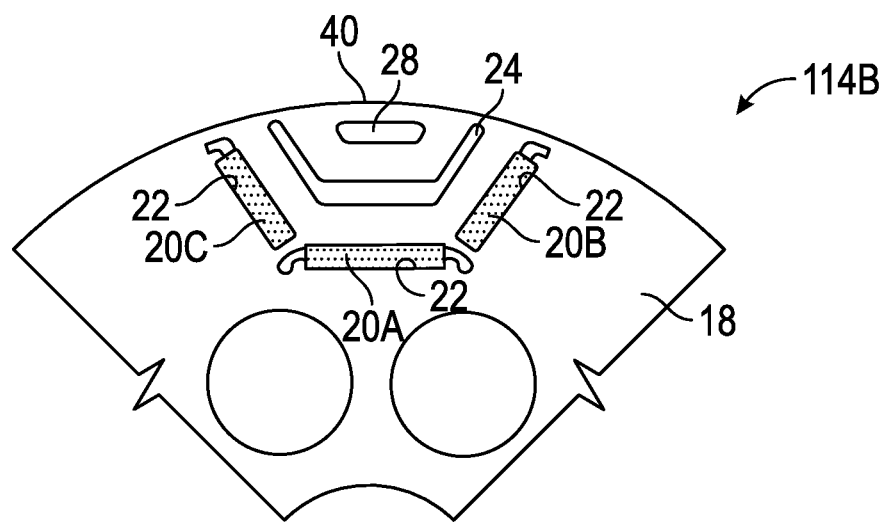
FIG. 7 is a schematic illustration in fragmentary side view of an alternative embodiment of a rotor assembly in accordance with the present teachings.

FIG. 7 shows a rotor assembly 114B identical to the rotor assembly 14 of electric machine 10 except that barrier layer 26 not present so that there are only three barrier layers 22, 24, and 28 at each rotor pole 40. Like rotor assembly 14 of FIG. 1, only the barrier layer 22 holds magnets 20A, 20B, and 20C, and the additional barrier layers 24 and 28 are empty.

Figure 8:
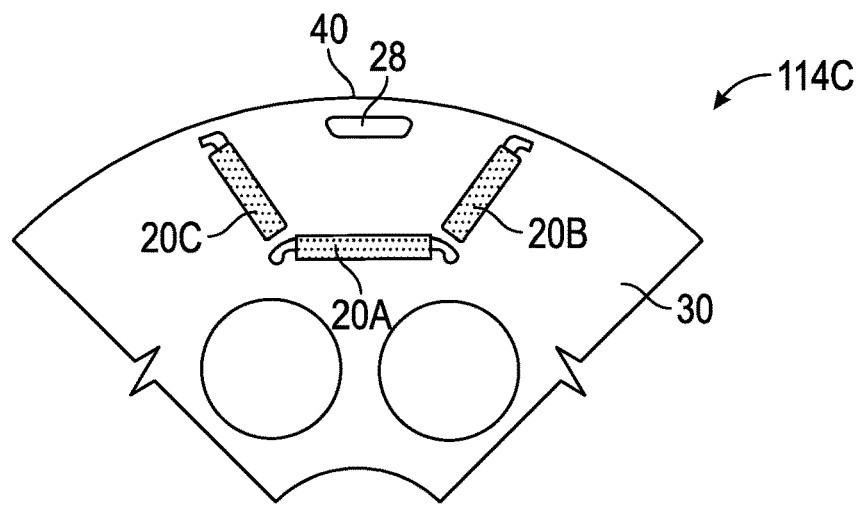
FIG. 8 is a schematic illustration in fragmentary side view of an alternative embodiment of a rotor assembly in accordance with the present teachings.

FIG. 8 shows a rotor assembly 114C identical to the rotor assembly 14 of electric machine 10 except that barrier layers 24 and 26 are not present so that there are only two barrier layers 22 and 28 at each rotor pole 40. Like rotor assembly 14 of FIG. 1, only the barrier layer 22 holds magnets 20A, 20B, and 20C, and the radially outermost barrier layer 28 is empty.

Figure 9:
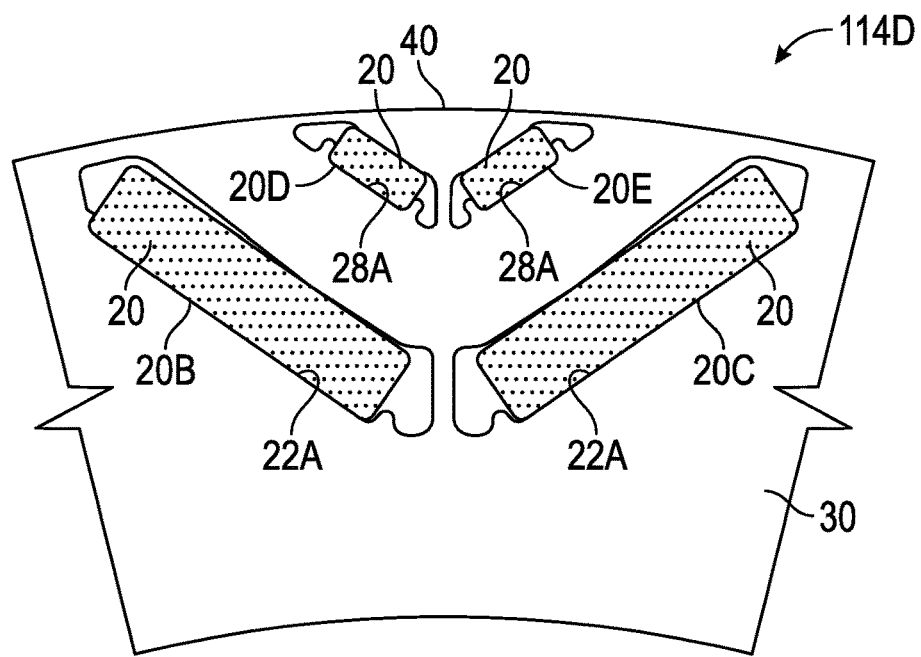
FIG. 9 is a schematic illustration in fragmentary side view of an alternative embodiment of a rotor assembly in accordance with the present teachings.

FIG. 9 shows a rotor assembly 114D identical to the rotor assembly 14 of electric machine 10 except that a total of two barrier layers 22A and 28A are used at each rotor pole 40, and the barrier layers 22A, 28A each have two discontinuous segments arranged in a V-formation. For example, barrier layer 22A has a first wing segment 20B and a second wing segment 20C arranged generally in a V-formation. In other words, there is no center segment 20A as in FIG. 1. Similarly, barrier layer 28A has a first wing segment 20D and a second wing segment 20E arranged generally in a V-formation. In the embodiment shown, all of the segments of both of the barrier layers 22A and 28A are filled with magnets 20.

Figure 13:
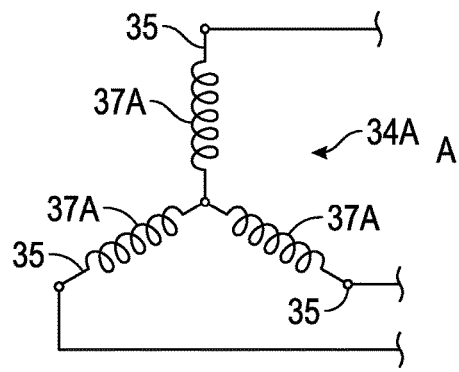
FIG. 13 is a schematic illustration of a first embodiment of three phase windings for a stator assembly in accordance with the present teachings.

FIGS. 13-19 show various embodiment of multi-phase stator windings 34A-34G any of which can be used as the stator windings 34 in the stator slots 32 of any of the electric machines and stator assemblies discussed herein. Each of the stator windings 34A-34G is configured to provide different numbers of phases of alternating current. Stator winding 34A shown in FIG. 13 is a three phase stator winding with three terminals 35 arranged in a star configuration (also referred to as Y or wye configuration). Stator winding 34A is shown with five turns per coil 37A, but may have anywhere from six to ten turns per coil.

Figure 14:
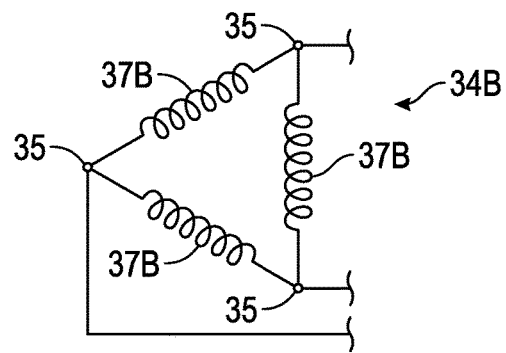
FIG. 14 is a schematic illustration of a second embodiment of three phase windings for a stator assembly in accordance with the present teachings.

Stator winding 34B shown in FIG. 14 is a three phase stator winding with three terminals 35 arranged in a delta configuration. Stator winding 34B is shown with six turns per coil 37B, but may have anywhere from five to ten turns per coil.

Figure 15:
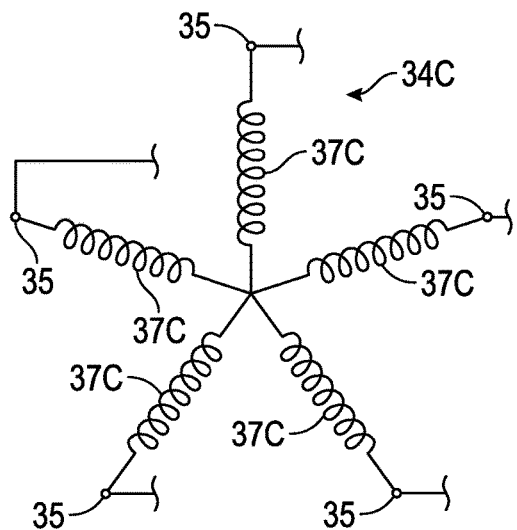
FIG. 15 is a schematic illustration of a first embodiment of five phase windings for a stator assembly in accordance with the present teachings.

Stator winding 34C shown in FIG. 15 is a five phase stator winding with five terminals 35 arranged in a five point star configuration. Stator winding 34C is shown with seven turns per coil 37C, but may have anywhere from five to ten turns per coil.

Figure 16:
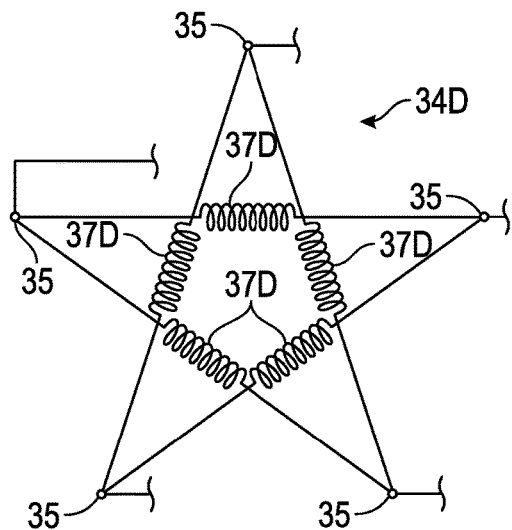
FIG. 16 is a schematic illustration of a second embodiment of five phase windings for a stator assembly in accordance with the present teachings.

Stator winding 34D shown in FIG. 16 is a five phase stator winding with five terminals 35 arranged in an alternate five point star configuration. Stator winding 34D is shown with eight turns per coil 37D, but may have anywhere from five to ten turns per coil.

Figure 17:
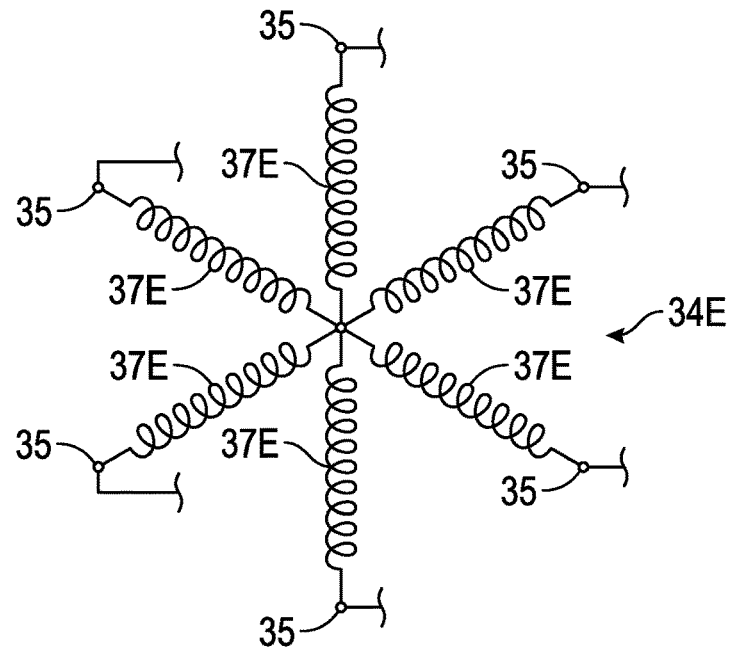
FIG. 17 is a schematic illustration of a first embodiment of six phase windings for a stator assembly in accordance with the present teachings.

Stator winding 34E shown in FIG. 17 is a six phase stator winding with six terminals 35 arranged in a six point star configuration. Stator winding 34E is shown with nine turns per coil 37E, but may have anywhere from five to ten turns per coil.

Figure 18:
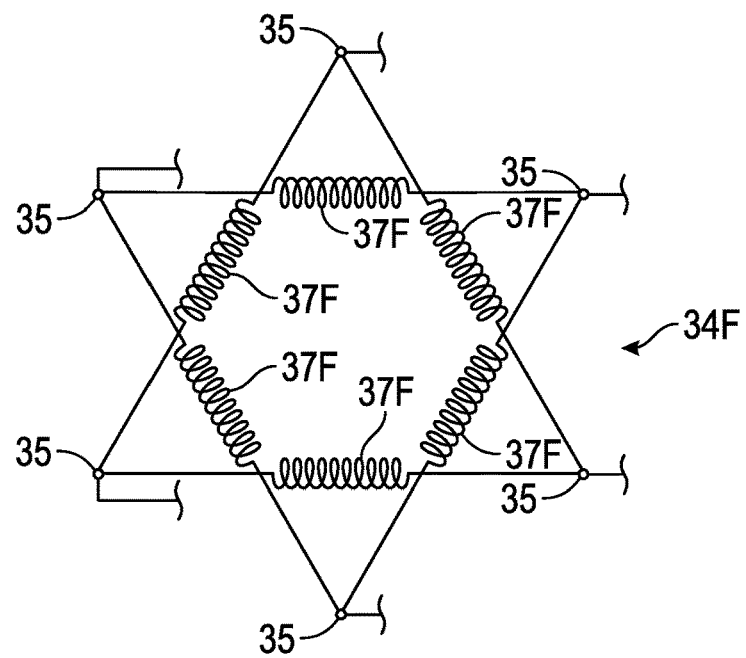
FIG. 18 is a schematic illustration of a second embodiment of six phase windings for a stator assembly in accordance with the present teachings.

Stator winding 34F shown in FIG. 18 is a six phase stator winding with six terminals 35 arranged in an alternate six point star configuration. Stator winding 34F is shown with ten turns per coil 37F, but may have anywhere from five to ten turns per coil.

Figure 19:
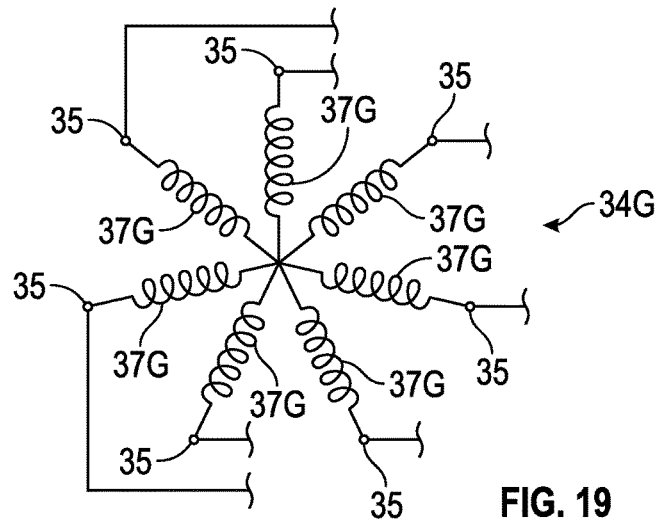
FIG. 19 is a schematic illustration of a first embodiment of seven phase windings for a stator assembly in accordance with the present teachings.

Stator winding 34G shown in FIG. 19 is a seven phase stator winding with seven terminals 35 arranged in a seven point star configuration. Stator winding 34G is shown with five turns per coil 37G, but may have anywhere from five to ten turns per coil.

The electric motor 10, 10A, or 10B with any of the various stator assemblies 12, 12A, with any of the various stator windings 34A, 34B, 34C, 34D, 34E, 34F, or 34G, and any of the various rotor assemblies 14, 14A, 114A, 114B, 114C, 114D, 114E, or 114F, in any combination, can be used in many applications, such as on a vehicle. One non-limiting example use is shown in FIG. 20, where the electric motor 10 is included in the powertrain 300 of vehicle 302. Although shown as electric motor 10, any of the electric motor 10, 10A, or 10B with any of the various stator assemblies 12, 12A, any of the various stator windings 34A, 34B, 34C, 34D, 34E, 34F, or 34G, and any of the various rotor assemblies 14, 14A, 114A, 114B, 114C, 114D, 114E, or 114F, in any combination, can be used in the powertrain 300.

The powertrain 300 also includes an engine 304 having a crankshaft 306. A belt drive train 308 operatively connects the electric machine 10 with the crankshaft 306 when a selectively engageable clutch 322A is engaged. The powertrain 300 is a hybrid powertrain and more specifically, a fossil fuel-electric hybrid powertrain because, in addition to the engine 14 as a first power source powered by fossil fuel, such as gasoline or diesel fuel, the electric machine 10 powered by stored electrical energy is available as a second power source. The electric machine 10 is controllable to function as a motor or as a generator and is operatively connectable to the crankshaft 306 of the engine 304 via the belt drive train 308 when the selectively engageable clutch 322A is engaged. The belt drive train 308 includes a belt 310 that engages with a pulley 312. The pulley 312 is connected to and rotates with the motor shaft 29 of the electric motor 10 only when the selectively engageable clutch 322A is engaged. The belt 310 also engages with a pulley 314 connectable to rotate with the crankshaft 306. When the pulley 312 is connected to rotate with the electric machine 10 and the pulley 314 is connected to rotate with the crankshaft 306, the belt drive train 308 establishes a driving connection between the electric machine 10 and the crankshaft 306. The electric machine 10 may be referred to as a belt-alternator-starter motor/generator in this arrangement. Alternatively, the belt drive train 308 may include a chain in lieu of the belt 310 and sprockets in lieu of the pulleys 312, 314. Both such embodiments of the belt drive train 308 are referred to herein as a "belt drive train".

A motor controller power inverter module (MPIM) 316 is operatively connected to the stator assembly 12. As shown, the MPIM 316 is mounted directly to the electric machine 10. A battery 318 is operatively connected to the stator assembly 12 through the MPIM 316 and through one or more additional controllers 320 that are also operatively connected to the engine 304, to a transmission 321, to a vehicle auxiliary load 323, and to clutches 322A, 322B, and 324. The operative connections to the engine 304, transmission 321 and clutches 322A, 322B, and 324 are not shown for purposes of clarity in the drawings. The connections to the transmission 321 and clutches 322A, 322B, and 324 may be electronic, hydraulic, or otherwise.

When clutch 324 is engaged, and assuming internal clutches in the transmission 321 are controlled to establish a driving connection between the transmission input member 334 and the transmission output member 336, torque transfer can occur between the crankshaft 306 and vehicle wheels 330 through the transmission 321 and through a differential 332.

Under predetermined operating conditions, the controller 320 can cause the clutch 322B to be engaged, and the MPIM 316 can control the electric machine 10 to function as a motor. The electric machine 10 can then drive the crankshaft 306 via intermeshing gears 340, 342 to start the engine 304. Gear 340 is mounted on and rotates with a shaft 346 that rotates with the motor shaft 29 when clutch 322B is engaged. Gear 342 is mounted on and rotates with the crankshaft 306. Clutch 322A is not engaged during cranking of the engine 304.

When the engine 304 is on, and when predetermined operating conditions are met, the MPIM 316 is configured to control the electric machine 10 to achieve a motoring mode in which the electric machine 10 adds torque to the crankshaft 306 using stored electrical power from the battery 318. This may be referred to as a torque assist mode. The battery 318 has a nominal voltage of 12 volts in the embodiment shown. As such, the battery 318 provides a voltage level (12 volts) that is suitable for, and used to power, the auxiliary load 323 of the vehicle, which may include interior and exterior lighting systems, heating and cooling systems, etc.

The electric motor 10 adds torque through the belt drive train 308, with clutch 322A engaged and clutch 322B not engaged. When the engine 304 is on and other predetermined operating conditions are met, the MPIM 316 is configured to control power flow in the stator assembly 12 to achieve a generating mode in which the electric machine 10 converts torque of the crankshaft 306 into stored electrical power in the battery 318, with clutch 322A engaged and clutch 322B not engaged. Operation of the electric machine 10 as a generator slows the crankshaft 306. For example, the generating mode may be established during vehicle braking.

Figure 26:
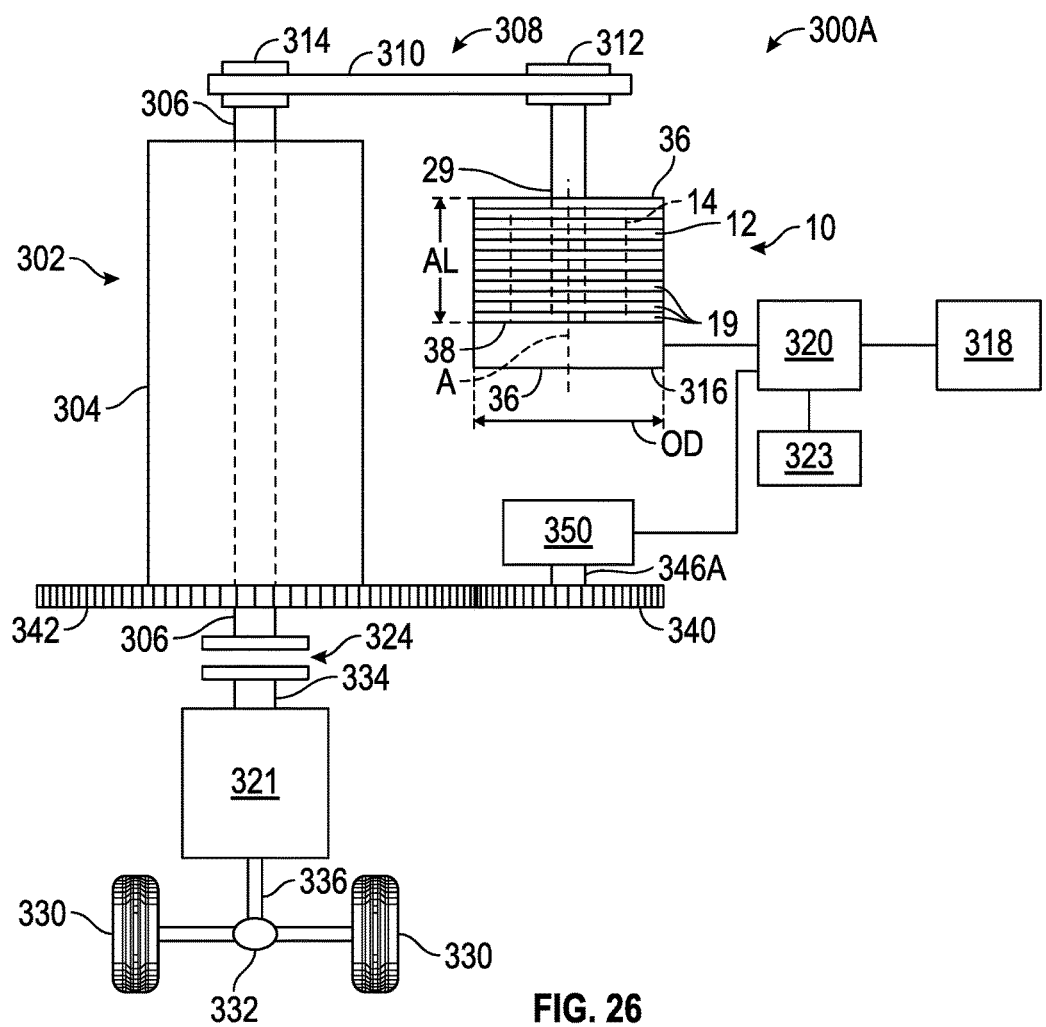
FIG. 26 is a schematic illustration of an alternative embodiment of a powertrain including the electric machine of FIG. 1.

FIG. 26 shows another embodiment of a powertrain 300A in which the electric machine 10 is continuously operatively connected to the crankshaft 306 via the belt drive train 308 and pulley 312 (i.e., there is no clutch 322A as in FIG. 20). The electric machine 10 can add torque to the crankshaft 306 when controlled by the MPIM 316 to operate as a motor during vehicle acceleration, and can be driven by the engine when controlled by the MPIM 316 to operate as a generator during braking or charging. A starter motor 350 has a motor shaft 346A that is connected to rotate with gear 340. The starter motor 350 is thus continuously operatively connected to the crankshaft 306 via the gears 340, 342 and is controlled by controller 320 to start the engine 304 under predetermined operating conditions, such as a cold start or an auto-start. A cold start is a start of the engine following vehicle shutdown. An auto-start is a start of the engine 304 following a temporary shutdown during vehicle operation, such as following a stop of the vehicle at a traffic light. Alternatively, the electric machine 10 may be controlled to start the engine 304 in an embodiment in which the engine 304 is relatively small and the ratio of pulley 312 to pulley 314 allows sufficient torque. The components of powertrain 300A otherwise function as described with respect to like numbered components of powertrain 300.

Figure 21:
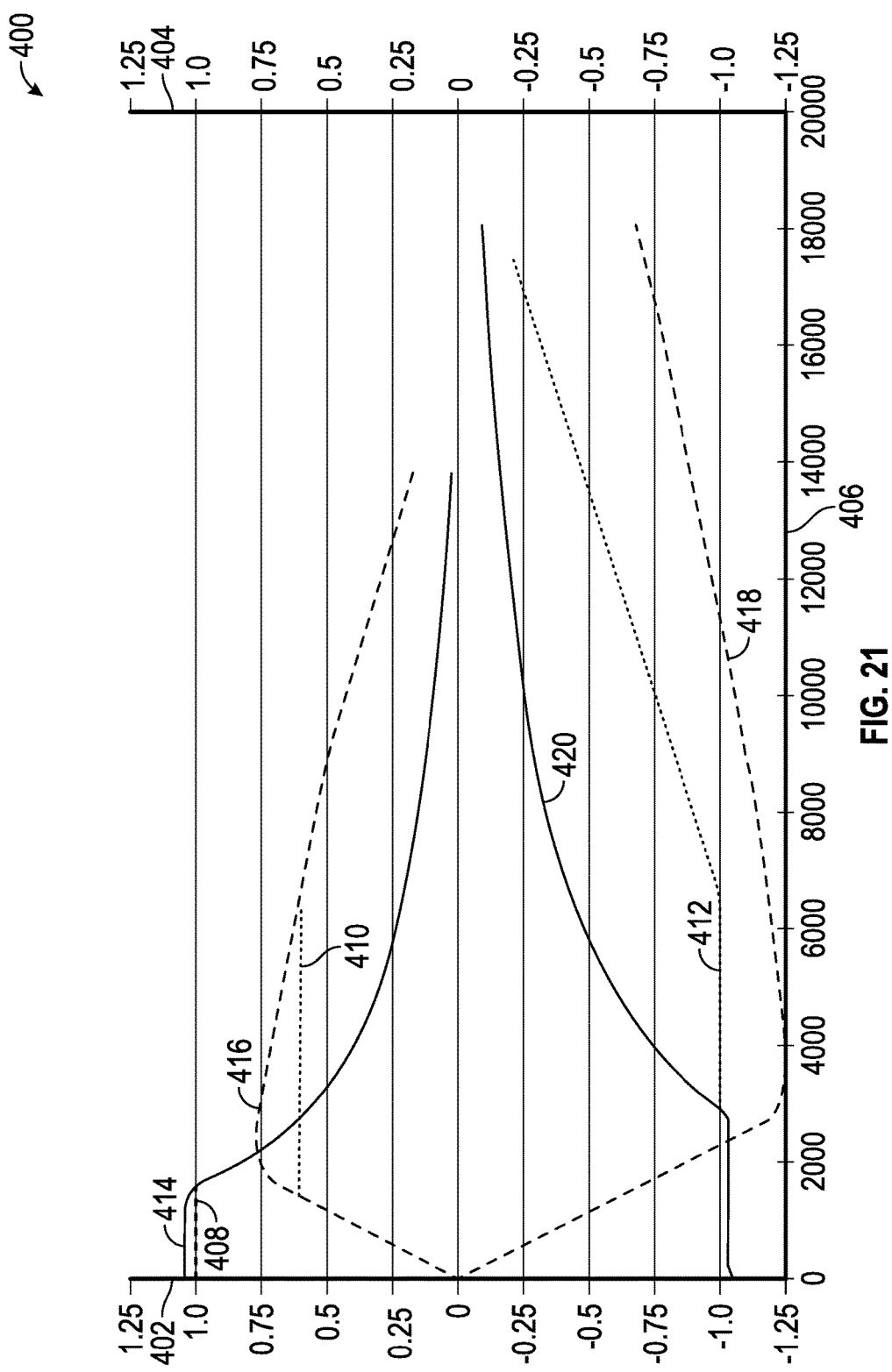
FIG. 21 is a plot of torque per unit of base torque (pu) and power per unit of base power (pu) versus speed (revolutions per minute) of an electric machine in accordance with the present teachings.

In the application shown in FIG. 20 or in other vehicle powertrain applications, the electric machine 10 is configured to achieve at least 80% efficiency (in the motoring mode) over a predefined output power and speed range as illustrated in FIG. 21. The electric machine 10 is configured to achieve at least 85% efficiency (in the generating mode). The predefined output power range is 1500 to 5000 watts, and the predefined speed range is 1500-8000 rpm. The electric machine 10 is configured to have a maximum speed of at least 18,000 revolutions per minute. Referring to FIG. 21, a plot 400 shows torque of the electric machine 10 per unit of base torque (pu) on the left-side vertical axis 402. Power of the electric machine 10 per unit of base power (pu) is shown on the right side vertical axis 404. Speed of the rotor assembly 14 in revolutions per minute (rpm) is shown on the horizontal axis 406. Some of the predetermined operating parameters that the geometry of the electric machine 10 is specifically designed to satisfy include a motoring peak torque requirement 408 (e.g., greater than 16 Newton-meters), a motoring power requirement 410 (e.g., 2.4 kilowatts), and a generating power requirement 412 (e.g., 4.4 kilowatts). Motoring torque 414 theoretically achievable by the electric machine 10 exceeds the motoring peak torque requirement 408. Motoring power 416 theoretically achievable by the electric machine 10 exceeds the motoring power requirement 410. The magnitude of the generating power 418 theoretically achievable by the electric machine 10 exceeds the generating power requirement 412. Generating torque 420 is also shown, and extends at least to a speed of the electric machine 10 of 18,000 rpm.

Figure 22:
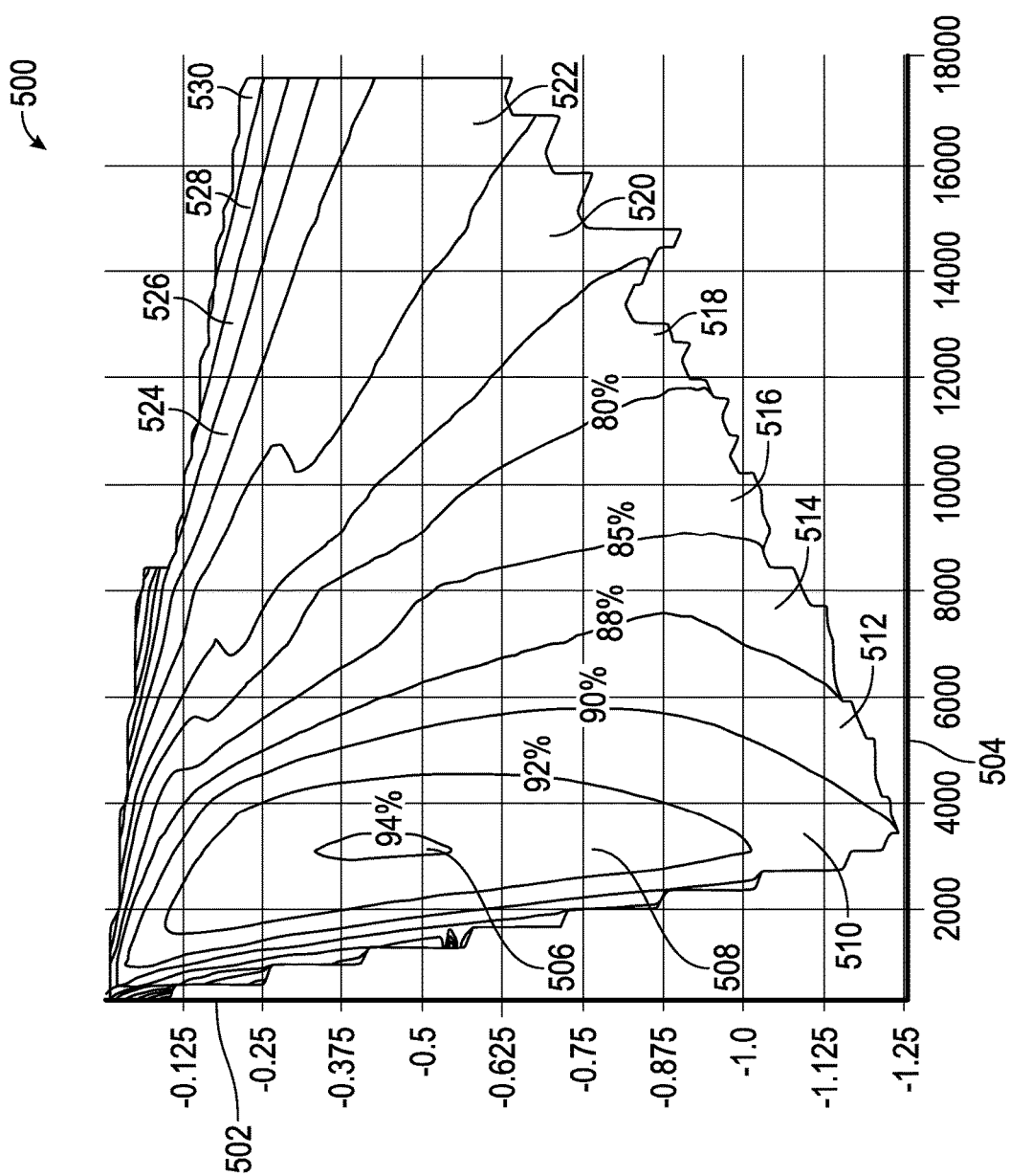
FIG. 22 is an efficiency map at different powers per unit of base power (pu) and speeds (revolutions per minute) during a generating mode of an electric machine in accordance with the present teachings.

FIG. 22 shows a map 500 of the efficiency of the electric machine 10 when operating in a 14 volt generating mode. Power of the electric machine 10 per unit of base power (pu) is shown on the vertical axis 502. Speed of the electric machine 10 in rpm is shown on the horizontal axis 504. Regions of different operating efficiencies of the electric machine 10 are shown bounded by dashed lines including: a 94% operating efficiency zone 506; a 92% operating efficiency zone 508; a 90% operating efficiency zone 510; an 88% operating efficiency zone 512; an 85% operating efficiency zone 514; an 80% operating efficiency zone 516; an approximately 75% operating efficiency zone 518; an approximately 65% operating efficiency zone 520; an approximately 55% operating efficiency zone 522; an approximately 45% operating efficiency zone 524; an approximately 35% operating efficiency zone 526; an approximately 25% operating efficiency zone 528; and an approximately 15% operating efficiency zone 530.

Figure 23:
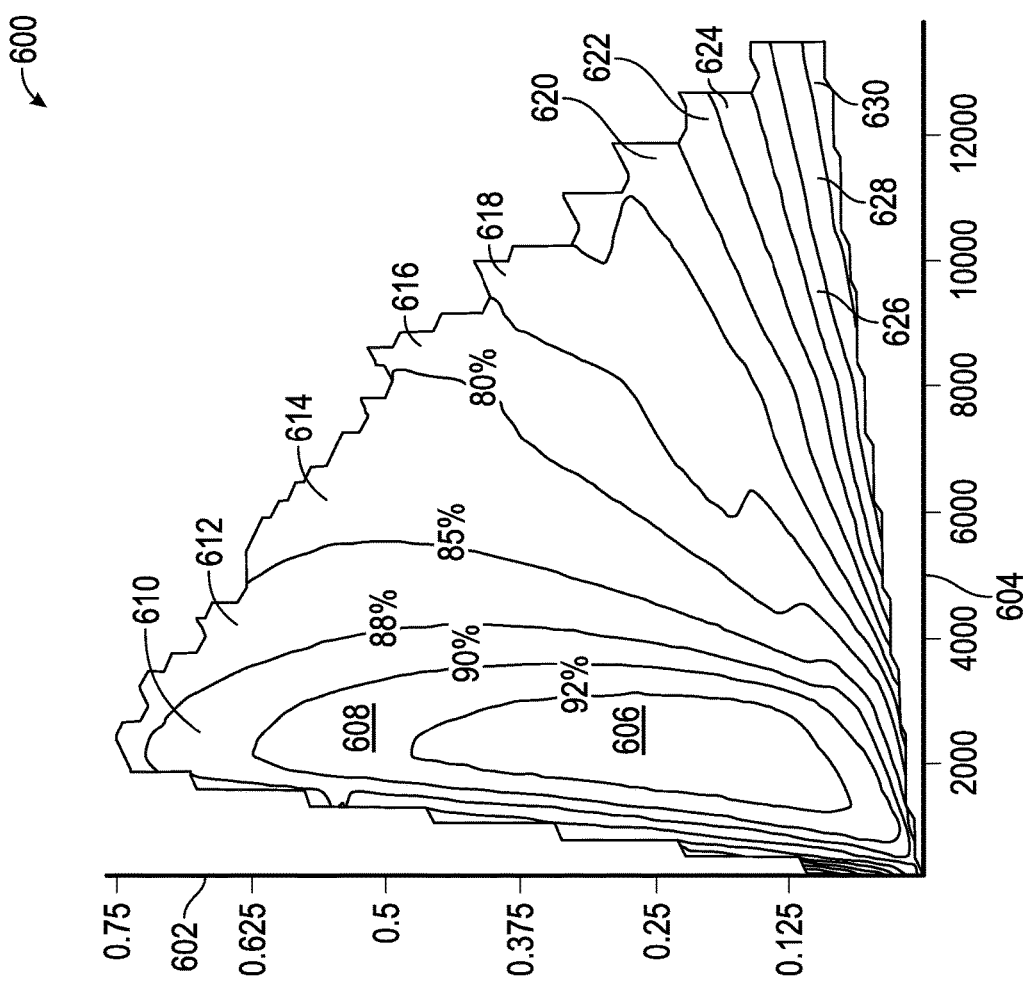
FIG. 23 is an efficiency map at different powers per unit of base power (pu) and speeds (revolutions per minute) during a motoring mode of an electric machine in accordance with the present teachings.

FIG. 23 shows a map 600 of the efficiency of the electric machine 10 when operating in an 11 volt motoring mode. Power of the electric machine 10 per unit of base power (pu) is shown on the vertical axis 602. Speed of the electric machine 10 in rpm is shown on the horizontal axis 604. Regions of different operating efficiencies of the electric machine 10 are shown bounded by dashed lines including: a 92% operating efficiency zone 606; a 90% operating efficiency zone 608; an 88% operating efficiency zone 610; an 85% operating efficiency zone 612; an 80% operating efficiency zone 614; an approximately 75% operating efficiency zone 616; an approximately 70% operating efficiency zone 618; an approximately 65% operating efficiency zone 620; an approximately 60% operating efficiency zone 622; an approximately 55% operating efficiency zone 624; an approximately 50% operating efficiency zone 626; an approximately 45% operating efficiency zone 628; and an approximately 40% operating efficiency zone 630. The electric machine 10 is configured to provide at least 85% efficiency between 2500-7500 rpm for the generating mode and at least 80% efficiency from 1500-5000 rpm for the motoring mode between certain power levels, for example, from 1000 watts to 2500 watts.

Figure 24:
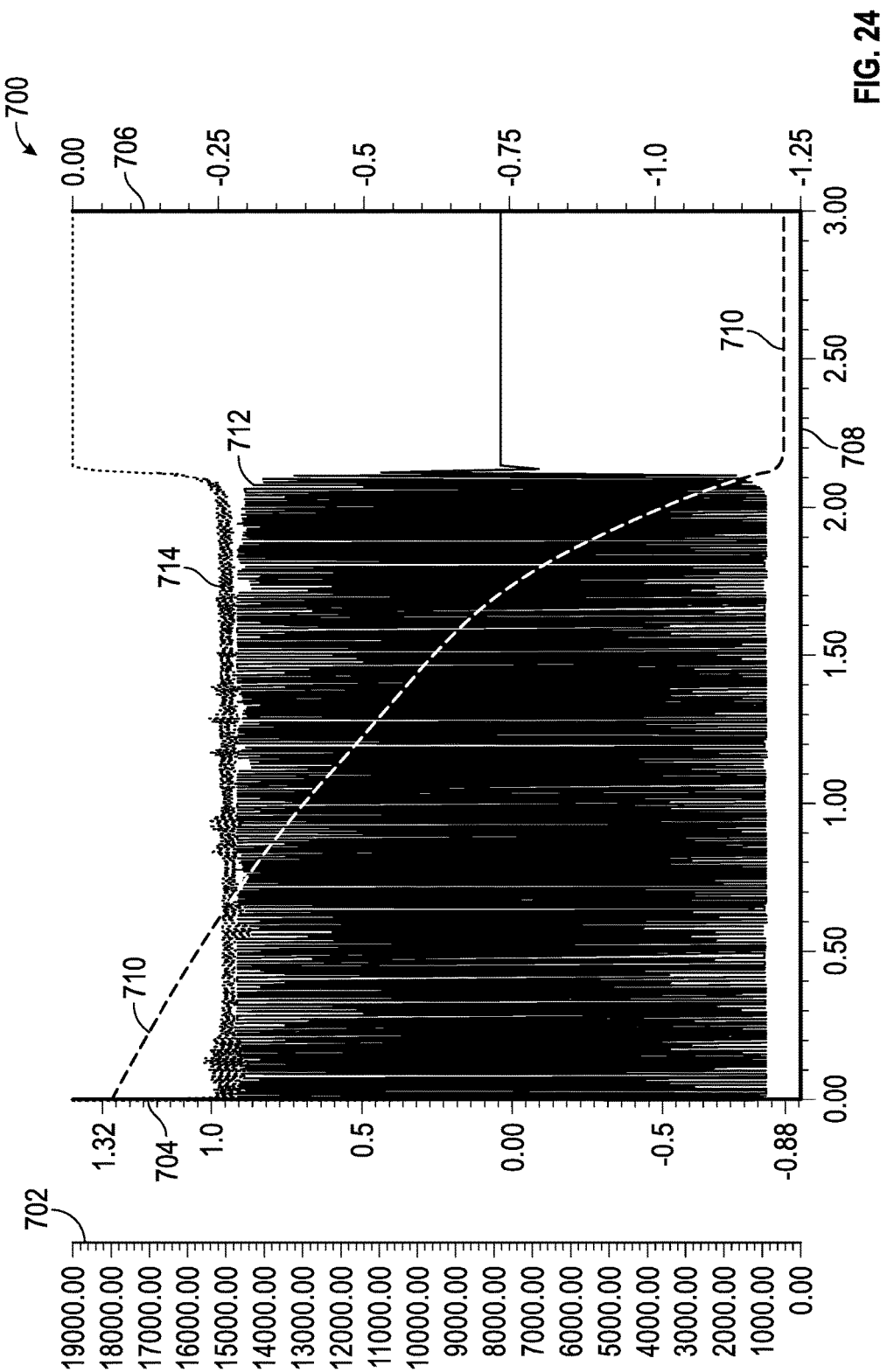
FIG. 24 is a plot of rotor speed (revolutions per minute), power per unit of base power (pu) and phase A current per unit of base current (pu) versus time (seconds) during a three-phase short circuit event of an electric machine in accordance with the present teachings.

FIG. 24 is a plot 700 of the rotational speed in rpm of the rotor assembly 14 in rpm on the far left vertical axis 702, a phase A current per unit of base current (pu) in the windings 34 of stator assembly 12 on the other left-side vertical axis 704, power of the electric machine 10 per unit of base power (pu) on the right side vertical axis 706, and time in seconds on the horizontal axis 708 during a three-phase short circuit event. The short circuit event occurs by connecting the phases of the windings 34 together while the rotor assembly 14 is free spinning (i.e., without torque on the motor shaft 29) at high speeds, such as greater than 4000 rpm. The resulting speed of the rotor assembly 14 is shown by curve 710. The phase current of phase A is shown by curve 712. The power loss in the electric machine 10 is shown by curve 714. In the exemplary embodiment shown in FIG. 10, the actual short circuit current is not less than a predetermined value, for example, 0.6 multiplied by the rated current of the electric machine 10, and not more than a predetermined value, for example 0.95 multiplied by the rated current of the electric machine 10. For example, in the embodiment providing the short circuit performance shown in FIG. 24, the rated current is 320 root mean square Amps (Arms) and the maximum short circuit current is 268 Arms.

Figure 25:
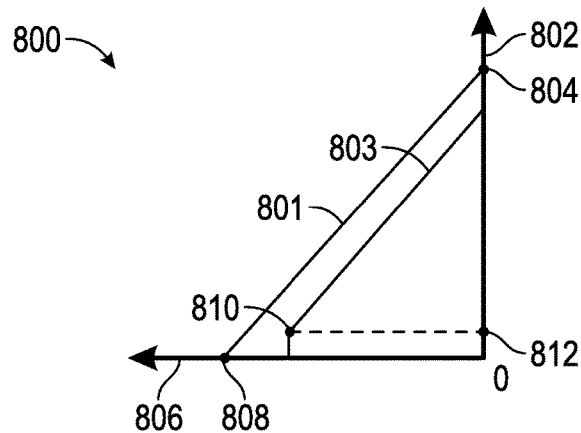
FIG. 25 is a plot of remanence versus coercivity of magnets in an electric machine in accordance with the present teachings.

Relatively strong magnet material is used to achieve the predetermined power density. For example, in order to satisfy the power requirements, demagnetization plots 800 of the magnets 20 shown in FIG. 25 has remanence (Br) 802 on the Y-axis and coercivity 806 on the X-axis. Plot 801 is for the magnets 20 at 100 degrees C., and plot 803 is for the magnets 20 at 180 degrees C. Remanence has a value 804 that is greater than 0.9 Tesla at 100 degrees C. Coercivity 806 of the magnets 20 on the X-axis has an absolute value 808 greater than 800 kilo Amps per meter at 100 degrees C. The remanence (Br) at the knee point 810 of the demagnetization plot 803 has a value 812 that is less than 0.15 Tesla.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An electric machine comprising:
a rotor assembly having a rotor core configured to support permanent magnets spaced around the rotor core to define a number of rotor poles;
wherein the rotor core has multiple rotor slots arranged as multiple barrier layers at each of the rotor poles; wherein the multiple barrier layers are positioned adjacent one another between an inner periphery of the rotor core and an outer periphery of the rotor core and include a first barrier layer nearest the inner periphery;
permanent magnets disposed in at least the first barrier layer;
a stator assembly surrounding the rotor assembly;
wherein the electric machine is configured to function as a motor in a motoring mode and as a generator in a generating mode;
wherein the rotor assembly, the stator assembly, and the permanent magnets are configured with parameters selected to provide at least one of a predetermined efficiency at rated power, a predetermined power density, a predetermined torque density, a predetermined peak power range, or a predetermined maximum speed of the electric machine in the motoring mode or in the generating mode; and
wherein the predetermined efficiency is at least 85 percent efficiency for the generating mode over a predetermined power and speed range and 80 percent efficiency for the motoring mode over a predetermined power and speed range, the predetermined power density is greater than 1500 watts per liter (W/L), the predetermined torque density is greater than 5 Newton-meters per liter (Nm/L), the predetermined peak power range is 4 to 6 kilowatts (kW), and the predetermined maximum speed is at least 18,000 revolutions per minute.

2. The electric machine of claim 1, further comprising:
a motor controller power inverter module (MPIM) operatively connected to the stator assembly;
and in combination with:
an engine having a crankshaft;
a belt drive train operatively connecting the electric machine with the crankshaft; and
a battery operatively connected to the stator assembly;
wherein the MPIM is configured to control the electric machine to achieve the motoring mode in which the electric machine adds torque to the crankshaft using stored electrical power from the battery;
wherein the MPIM is configured to control the electric machine to achieve the generating mode in which the electric machine converts torque of the crankshaft into stored electrical power in the battery.

3. The electric machine of claim 2, wherein the electric machine, the MPIM, the engine, the belt drive train, and the battery are on a vehicle, and wherein the battery provides a voltage level for an auxiliary load of the vehicle.

4. The electric machine of claim 1, wherein the stator assembly has three, five, six, or seven electrical phases, and the number of turns in electrical windings per each of said electrical phases is not less than five and not more than 10.

5. The electric machine of claim 1, wherein an air gap between the stator assembly and the rotor assembly is not less than 0.2 millimeters and not greater than 0.5 millimeters.

6. The electric machine of claim 1, wherein the stator assembly has multiple axially-stacked stator laminations; and
wherein a ratio of an outer diameter of the stator laminations to an axial length of the stator laminations is not less than 1.5 and not greater than 3.5.

7. The electric machine of claim 6, wherein the outer diameter of the stator laminations is not greater than 136 millimeters and the axial length of the stator laminations is not greater than 60 millimeters.

8. The electric machine of claim 1, wherein the rotor core has at least six and not more than twelve rotor poles.

9. The electric machine of claim 1, wherein the stator assembly has a number of stator slots circumferentially-spaced around the stator assembly and configured to support stator windings; and
wherein a lowest common multiplier of the number of stator slots and the number of rotor poles is greater than or equal to 48.

10. The electric machine of claim 9, wherein the lowest common multiplier is greater than or equal to 84.

11. The electric machine of claim 9, wherein the permanent magnets are in a non-skewed arrangement relative to a direction along an axis of rotation of the rotor core.

12. The electric machine of claim 1, wherein the stator assembly has a number of stator slots circumferentially-spaced around the stator assembly and configured to support stator windings; and
wherein a greatest common divisor of the number of the stator slots and the number of the rotor poles is at least 4.

13. The electric machine of claim 12, wherein:
the number of rotor poles is six and the number of stator slots is 48, 72, 90, or 108; or
the number of rotor poles is eight and the number of stator slots is 60, 72, 84, 96, or 108.

14. The electric machine of claim 1, wherein a short circuit current over an entire speed range of the electric machine is not less than 0.6 and not more than 0.95 multiplied by a rated current of the electric machine.

15. The electric machine of claim 1, wherein the multiple barrier layers are not less than two and not greater than five barrier layers.

16. The electric machine of claim 15, wherein at least a radially outermost one of the multiple barrier layers is empty.

17. The electric machine of claim 1, wherein the first barrier layer has multiple segments including a center segment and wing segments extending toward the outer periphery from the center segment; and wherein the wing segments are discontinuous from the center segment.

18. The electric machine of claim 17, wherein the multiple barrier layers include at least one barrier layer positioned radially outward of the center segment and between the wing segments of the first barrier layer.

19. An electric machine comprising:
a rotor assembly having a rotor core configured to support permanent magnets spaced around the rotor core to define a number of rotor poles;
wherein the rotor core has multiple rotor slots arranged as multiple barrier layers at each of the rotor poles;
wherein the multiple barrier layers are positioned adjacent one another between an inner periphery of the rotor core and an outer periphery of the rotor core and include a first barrier layer nearest the inner periphery;
permanent magnets disposed in at least the first barrier layer;
a stator assembly surrounding the rotor assembly;
wherein the electric machine is configured to function as a motor in a motoring mode and as a generator in a generating mode;
wherein the rotor assembly, the stator assembly, and the permanent magnets are configured with parameters selected to provide at least one of a predetermined efficiency at rated power, a predetermined power density, a predetermined torque density, a predetermined peak power range, or a predetermined maximum speed of the electric machine in the motoring mode or in the generating mode; and
wherein the permanent magnets have a remanence greater than 0.9 Tesla (T) at 100 degrees Celsius, a coercivity with an absolute value greater than 800 kiloamps per meter (kA/m) at 100 degrees Celsius, and a remanence at a knee point of less than 0.15 T at 180 degrees Celsius such that the electric machine has the predetermined power density.

20. The electric machine of claim 19, further comprising:
a motor controller power inverter module (MPIM) operatively connected to the stator assembly;
and in combination with:
an engine having a crankshaft;
a belt drive train operatively connecting the electric machine with the crankshaft; and
a battery operatively connected to the stator assembly;
wherein the MPIM is configured to control the electric machine to achieve the motoring mode in which the electric machine adds torque to the crankshaft using stored electrical power from the battery;
wherein the MPIM is configured to control the electric machine to achieve the generating mode in which the electric machine converts torque of the crankshaft into stored electrical power in the battery.

* * * * *